US009069061B1

(12) United States Patent
Harwit (10) Patent No.: US 9,069,061 B1
(45) Date of Patent: Jun. 30, 2015

(54) LIDAR WITH ANALOG MEMORY

(75) Inventor: Alex Harwit, Boulder, CO (US)

(73) Assignee: BALL AEROSPACE & TECHNOLOGIES CORP., Boulder, CO (US)

( * ) Notice: Subject to any disclaimer, the term of this patent is extended or adjusted under 35 U.S.C. 154(b) by 397 days.

(21) Appl. No.: 13/553,710

(22) Filed: Jul. 19, 2012

Related U.S. Application Data

(60) Provisional application No. 61/509,200, filed on Jul. 19, 2011.

(51) Int. Cl.
G01C 3/08 (2006.01)
G01S 7/486 (2006.01)

(52) U.S. Cl.
CPC .................. G01S 7/4863 (2013.01)

(58) Field of Classification Search
CPC ........ G01C 3/08; G01C 15/002; G01S 17/89; G01S 7/4817; G01S 17/42
USPC ........... 356/3.01, 3.09, 4.01, 4.07, 5.01, 5.09, 356/9, 625
See application file for complete search history.

(56) References Cited

U.S. PATENT DOCUMENTS

| 4,289,397 A | 9/1981 | Itzkan et al. |
|---|---|---|
| 5,099,128 A | 3/1992 | Stettner |
| 5,140,162 A | 8/1992 | Stettner |
| 5,258,613 A * | 11/1993 | Okada et al. ............. 250/227.11 |
| 5,446,529 A | 8/1995 | Stettner et al. |
| 5,475,225 A | 12/1995 | Stettner |
| 5,629,524 A | 5/1997 | Stettner et al. |
| 5,696,577 A | 12/1997 | Stettner et al. |
| 5,804,833 A | 9/1998 | Stettner et al. |
| 6,057,552 A | 5/2000 | Stettner et al. |
| 6,133,989 A | 10/2000 | Stettner et al. |
| 6,201,257 B1 | 3/2001 | Stettner et al. |
| 6,362,482 B1 | 3/2002 | Stettner et al. |
| 6,414,746 B1 | 7/2002 | Stettner et al. |
| 6,664,529 B2 | 12/2003 | Pack et al. |
| 6,690,019 B2 | 2/2004 | Stettner et al. |

(Continued)

FOREIGN PATENT DOCUMENTS

| EP | 1406435 A1 | 4/2004 |
|---|---|---|
| WO | 2007081628 A2 | 7/2007 |

OTHER PUBLICATIONS

Albota et al., "Three-Dimensional Imaging Laser Radars with Geiger-Mode Avalanche Photodiode Arrays", Lincoln Laboratory Journal, vol. 13, No. 2, 2002, 20 pages.

(Continued)

Primary Examiner — Luke Ratcliffe
Assistant Examiner — Samantha K Abraham
(74) Attorney, Agent, or Firm — Sheridan Ross P.C.

(57) ABSTRACT

LIDAR systems and methods are provided. More particularly, a distributed focal plane assembly is provided in which light collected by optical fibers is delivered to detectors on a separate substrate. Moreover, signals from detectors can be stored in analog memory on a different substrate from the detectors. Alternatively, light may be imaged onto detectors on one substrate and stored in analog memory on a different substrate. The detectors can be provided in a linear or one-dimensional array. A laser source can comprise a multiplexed laser source which provides a sequence of pulses separated in time and having different directions of propagation.

18 Claims, 8 Drawing Sheets

(56) References Cited

U.S. PATENT DOCUMENTS

| | | | |
|---|---|---|---|
| 6,798,523 B2 | 9/2004 | Lange et al. | |
| 6,816,102 B2 | 11/2004 | Pavicic | |
| 6,975,251 B2 | 12/2005 | Pavicic | |
| 7,107,306 B2 | 9/2006 | Nikitin | |
| 7,373,043 B2 | 5/2008 | Rice et al. | |
| 7,418,469 B2 | 8/2008 | Nikitin | |
| 7,453,553 B2 | 11/2008 | Dimsdale | |
| 7,489,865 B2 | 2/2009 | Varshneya et al. | |
| 7,575,190 B2 | 8/2009 | Sallee | |
| 7,617,270 B2 | 11/2009 | Nikitin | |
| 7,746,450 B2 | 6/2010 | Willner et al. | |
| 7,830,442 B2 | 11/2010 | Griffis et al. | |
| 8,072,581 B1 * | 12/2011 | Breiholz | 356/5.01 |
| 2003/0020734 A1 * | 1/2003 | Yin et al. | 345/660 |
| 2003/0029989 A1 | 2/2003 | Stettner et al. | |
| 2005/0012033 A1 * | 1/2005 | Stern et al. | 250/214 R |
| 2007/0252988 A1 * | 11/2007 | Levy | 356/328 |
| 2008/0284837 A1 * | 11/2008 | Cordingley et al. | 347/224 |
| 2009/0079956 A1 * | 3/2009 | Kennedy et al. | 356/4.01 |
| 2009/0115994 A1 | 5/2009 | Stettner et al. | |
| 2009/0262346 A1 * | 10/2009 | Egloff et al. | 356/326 |
| 2010/0091293 A1 * | 4/2010 | Shani | 356/477 |
| 2010/0102203 A1 | 4/2010 | Grund | |
| 2010/0157736 A1 * | 6/2010 | Riordan et al. | 367/88 |
| 2010/0208039 A1 | 8/2010 | Stettner | |
| 2010/0214554 A1 * | 8/2010 | Audier et al. | 356/5.01 |
| 2010/0276572 A1 * | 11/2010 | Iwabuchi et al. | 250/208.1 |
| 2010/0277713 A1 | 11/2010 | Mimeault | |
| 2010/0309288 A1 | 12/2010 | Stettner et al. | |
| 2011/0240865 A1 * | 10/2011 | Frach et al. | 250/362 |

OTHER PUBLICATIONS

Aull, Brian F., "Tech Notes—Specialized Avalanche Photodiode Arrays Enable Adaptive Optics Uses", Lincoln Laboratory, Massachusetts Institute of Technology, 2 pages.

Aull et al., "Geiger-Mode Avalanche Photodiodes for Three-Dimensional Imaging", Lincoln Laboratory Journal, vol. 13, No. 2, 2002, 16 pages.

Heinrichs et al., "Three-Dimensional Laser Radar with APD Arrays", Lincoln Laboratory, Massachusetts Institute of Technology, 12 pages.

Itzler et al., "Geiger-mode avalanche photodiode focal plane arrays for three-dimensional imaging LADAR", Infrared Remote Sensing and Instrumentation XVIII, 2010, 14 pages.

Itzler et al., "Design and performance of single photon APD focal plane arrays for 3-D LADAR imaging", Detectors and Imaging Device: Infrared, Focal Plane, Single Photon, 2010, 15 pages.

Marino et al., "A compact 3D imaging laser radar system using Geiger-mode APD arrays: system and measurements", Laser Radar Technology and Applications VIII, 2003, 15 pages.

Cottingame, William, "Requirements and Candidates for Ladar Single-Photon Detector Arrays", KECK Institute for Space Studies, California Institute of Technology, Jet Propulsion Laboratory, Single-Photon Counting Detectors Large Scale Study, 1st Workshop, Jan. 25-29, 2010, 18 pages.

O'Brien et al., "Simulation of 3D Laser Radar Systems", Lincoln Laboratory Journal, vol. 15, No. 1, 2006, 24 pages.

Stettner et al., "Eye-Safe Laser Radar 3-D Imaging", RTO SCI Symposium, Sensors and Sensor Denial by Camouflage, Concealment and Deception, Apr. 19-20, 2004, 23 pages.

Haller, Gunter Martin, "High-Speed, High-Resolution Analog Waveform Sampling", Stanford Linear Accelerator Center, Mar. 1994, 154 pages.

Paul Scherrer Institut (PSI), "9 Channel, 5 GSPS Switched Capacitor Array", Nov. 2008, 16 pages.

SensL, The Low Light Sensing Company, "SPMMicro Series High Gain APD", Jan. 2009, 6 pages.

Amplification Technologies, "DAPD10C Series Discrete Amplification Photon Detector", Amplification Technologies Inc., Jan. 2008, 4 pages.

Amplification Technologies, "NIRDAPD Series Discrete Amplification Photon Detector", Amplification Technologies Inc., Jan. 2009, 4 pages.

Richmond et al., "Polarimetric Imaging Laser Radar (PILAR) Program", Advanced Sensory Payloads for UAV, 2005, 35 pages.

Wetstein, Matthew, "Working Towards Large Area, Picosecond-Level Photodetectors", Enrico Fermi Institute, University of Chicago, HEP Division, Argonne National Lab, Jan. 6, 2011, 30 pages.

Frisch, Hentry, "The Development of Large-Area Thin Planar Psec Photodetectors", Enrico Fermi Institute, Jan. 6, 2011, 43 pages.

\* cited by examiner

LIDAR WITH ANALOG MEMORY

CROSS-REFERENCE TO RELATED APPLICATIONS

This application claims the benefit of U.S. Provisional Patent Application Ser. No. 61/509,200, filed Jul. 19, 2011, the entire disclosure of which is hereby incorporated herein by reference.

FIELD

The present invention relates to light detection and ranging (LIDAR) systems. More particularly, the present invention provides architectures that distribute the receiver electronics, lower the overall power dissipation of the system, and/or remap the light to utilize more sensitive detectors.

BACKGROUND

Waveform light detection and ranging systems (LIDARs) are increasingly used to measure features of the environment from airborne or on-orbit platforms. Waveform LIDARs are a powerful analytical technique to profile three-dimensional diffuse targets. From above, they can be used to measure the carbon content of forests, profile the density of organisms in the ocean, and characterize atmospheric phenomena. An orbiting observatory is an ideal platform from which to monitor these effects. Unfortunately, imaging LIDARs, even in low Earth orbits, are limited by the total optical power returned from the distant Earth. This in turn limits the number of available pixels over which to spread the available returned light. While there is insufficient light to illuminate millions of pixels in a large two-dimensional array, there may be sufficient light for tens, hundreds, or even thousands of pixels in a two-dimensional or in a line array. This orbiting situation naturally lends itself to a pushbroom LIDAR system with up to about a thousand pixels arranged as a line array in the cross track direction. This is in contrast to an airborne LIDAR platform where distances may be reduced from 400 km (Low Earth Orbit) to 13 km (airplane cruising levels), resulting in significantly more light: $(2\times400 \text{ km})^2/(2\times13 \text{ km})^2$, or almost 1000 times more light.

The returns from a target typically arrive at the LIDAR system at nearly the same time. As a result, and in particular for an imaging waveform LIDAR system, a large number of high speed storage elements are required. These storage elements may be in the form of analog or digital storage elements. If digital storage elements are utilized, a large number of high speed digitization elements are also required. In particular, one such analog storage element or one such digitization element/digital storage element pair is required for each pixel of the detector. In addition, the digitization and storage elements must be capable of operating at high speeds. For example, for a LIDAR system providing one meter resolution, data rates are above 160 MHz, with 400 MHz being more typical. Operating at these speeds, an analog to digital converter requires on the order of one watt of power. If 1,000 analog to digital converters are needed, the power requirement for those converters is 1,000 W, which is too high for deploying as part of an on-orbit platform.

LIDAR receivers that dissipate very low power provide a major advantage and have been in existence for a number of years. For example, systems have been developed that utilize one high speed low power analog memory per signal line. However, the resolution in the third dimension (distance) of the three-dimensional imaging of such waveform LIDAR systems has been limited. In particular, such systems have utilized analog and digital circuitry including analog memory contained in a ROIC pixel directly below and within an area defined by a detector pixel. As a result, there is insufficient area in which to provide sufficient analog memory to store a high resolution time history of the returned signal. This lack of memory limits the resolution of the time return of the LIDAR signal. For example, only 20 or 44 analog samples can be captured for each pixel per pulse. Applications in true volumetric imaging of diffuse targets require substantially more than 44 time samples.

SUMMARY

Embodiments of the present invention avoid such high power consumption by using analog memories in place of high speed analog to digital converters with digital memories. In contrast to the one watt power consumption of the high speed analog to digital converters, a channel of analog memory uses about 17 mW. Some number of analog to digital converters equal to a fraction of the number of analog memories can then be used for a readout process conducted between laser pulses. In particular, one medium speed analog to digital converter can be used to readout the data stored in the analog memories. By thus employing analog to digital converters (at a possibly lower data rate) and by reading out multiple analog memories with a single ADC (for example 1 ADC per 30 analog memory channels), power consumption can be reduced as compared to a conventional all digital readout circuit.

In accordance with embodiments of the present invention, a signal from a photon detector comprising a pixel of a detector array is stored in an analog memory. As an example, and without limitation, the analog memory may comprise a switched capacitor array. More particularly, an analog memory is provided for each detector in the detector array. In addition, analog to digital converters are provided to digitize the information stored by the analog memories. Moreover, there are fewer ADCs than analog memories. For example, there may be one ADC for every 30 analog memories. Each ADC digitizes in series the information in a plurality of memories. As a result, fewer power consuming ADCs are required, and the utilization rate (duty cycle) of the ADCs is increased, as compared to LIDAR systems that provide one ADC for each detector.

Although the analog memory design described herein allows for reduced power consumption as compared to LIDAR systems using direct analog to digital conversion of detected signals, one difficulty of the design concerns providing sufficient area for the analog memory cells and analog to digital converters. This is particularly true for systems that are capable of acquiring return signals over a period of time corresponding to the height of a tree canopy, with relatively fine (high) vertical resolution.

In order to overcome these limitations, a memory and digitization architecture in accordance with embodiments of the present invention can be combined with other features to provide a functional LIDAR system. For example, a distributed detector design, in which photons arriving in an area are delivered to a detector by an optical fiber, can be combined with the analog memory LIDAR approach. This "distributed focal plane assembly (DFPA)" configuration allows the detector array to provide high resolution over a relatively small area, while permitting detector, memory and ADC components to occupy an area that is unconstrained by the dimensions of the detector array. Moreover, this DFPA design allows enough analog memory to be provided such that relatively fine resolution in the third dimension over a relatively large vertical range can be achieved.

In accordance with still other embodiments a unique Geiger mode avalanche photodiode (GM-APD) design is provided. In particular, in a pushbroom type system, multiple parallel wired GM-APDs can be arranged to provide a single pixel of the array. Conventional Commercial-Off-The-Shelf (COTS) parts are already available from many manufacturers including Amplification Technologies Inc. (Paramus, N.J., USA), Hamamatsu Corporation (MPPC (Silicon Photomultipliers)), and SensL (Cork, Ireland). This array of GM-APDs is elongated in the along-track direction. This allows the LIDAR to provide high detection sensitivity, while avoiding the problem of significant recharge times for individual GM-APDs by providing a larger number of GM-APDs wired in parallel than could fit in a square pixel of a line array. This unique GM-APD design can be combined with the analog memory and digital converter design. Accordingly, signals from the GM-APDs can be delivered to analog memory cells for eventual analog to digital conversion in support electronics that are located separately from the GM-APDs.

In accordance with still other embodiments a unique angle-time-space LIDAR multiplexer design is provided. In particular, this system can be arranged to provide a two-dimensional LIDAR coverage with only a one-dimensional set of detectors and processing electronics. In an embodiment of the multiplexer design, the one-dimensional set of detectors and processing electronics can be the same pushbroom LIDAR with analog memory described above.

The reduction in detectors from a 2-D rectangular array to a 1-D line array is enabled by an angle-time-space division multiplexing architecture. More specifically, in a traditional 2-D flash LIDAR (from orbit), a laser pulse is sent to the ground and the reflected return is detected on a 2-D array of high speed detectors. Between pulses the 2-D array of detectors sees no reflected signals and during this time period, the capabilities of these detectors lie idle. This design makes use of an angle-time-space division multiplexing architecture to enable the 2-D array of detectors to be replaced with a 1-D line of detectors. This is enabled by having the 1-D line of detectors utilize much of the idle time between the original 2-D LIDAR pulses to collect the data for the other 2-D detectors that have now been removed. This is accomplished as follows:
1. The laser generating the output pulse is split into n (n may be for example 100) equal power beams that are separated in time. This may be enabled by:
   a. Coupling the laser to a (single mode) fiber and using a series of fiber taps to split the beam into n equal power beams. The different beams are then delayed using fiber delay lines on each beam.
   b. Alternatively (and this saves on the amount of fiber needed), the signal may be sent through a long fiber while taps along the long fiber remove power from the main beam at predefined positions (in time).
2. These separate beams are then routed to a V-Groove. This is like the type used in common ribbon fiber connectors. The V-Groove may be in a linear array of n elements.
3. A telescope now sends this as a line of pulses down to the ground. Due to the geometry of the telescope and the fibers being offset from one another, each pulse leaves at a slightly different angle from the telescope. The pulses are also spread in time to an extent that the reflected returns from each pulse do not overlap in time when they return to the spacecraft 2-D line of high speed detectors. This is despite range height differences between different returns.
   a. Effectively the telescope focuses a time sequenced series of dots into a line on the ground/target.
4. For the return path, a telescope focuses the returned light onto the 1-D line of high speed detectors.
5. If the light from the ground return can be separated from the cloud return due to the light arriving back at the spacecraft at slightly different angles from the cloud and from the ground then this can help mitigate the effects of cloud return from adjacent channels corrupting data. Should this spatial separation not be feasible, the timing would need to be set such that the time spacing between the beams is greater than the round trip time of flight between a cloud and the ground. This may require longer lengths of fiber on board.
6. As a numerical example, consider a 100 by 100 2-D flash LIDAR array. This multiplexer design replaces the need for 100×100=10,000 detectors and processing electronics with 100 detectors and processing electronics plus 100 fiber delay taps.
   a. Note that if analog memory is used in such a system, the analog memory depth per 2-D pixel will be reduced by a factor equal to the multiplex depth. In the example above, if each of the 100 detectors with processing electronics contained an 8,000 element analog memory, then each of the 10,000 returned pixels would have 8,000/100 or 80 elements of analog memory.

This system is particularly useful in scenarios where the space between the LIDAR system and the target of interest is free of other obstacles. Example scenarios include a forest as imaged from an orbiting platform on a cloudless day or an orbiting platform imaging other space objects or a spacecraft docking LIDAR.

Embodiments of the invention relate to true waveform LIDARs that return a full three-dimensional map of a diffuse object as opposed to a surface contour. If for example, the diffuse object were a forest, the waveform LIDAR would return the density of the forest as a function of height—data useful in estimating the biomass and health of the forest.

In accordance with embodiments of the present disclosure, the capacity to store a large number of time stamps is facilitated by moving the analog memory out of the pixel. More specifically, LIDAR innovators strive to develop systems that are more compact and more monolithic to reduce SWaP (Size Weight and Power). But in this case, the drive to reduce SWaP results in reduced performance, specifically the number of time stamps that can be stored in a waveform LIDAR return pulse. While embodiments of the present invention do not necessarily reduce SWaP, they bring the performance benefit of increased time resolution to three-dimensional waveform LIDARs that is not feasible under the current paradigms of waveform LIDAR development.

In addition, while embodiments of the present disclosure do not reduce SWaP by incorporating more logic into integrated circuits, they can incorporate an angle-time-space LIDAR multiplexer design that reduces SWaP. In particular, the multiplexing scheme described herein can be used in combination with the analog memory configuration described herein or by itself in a LIDAR system. This multiplexing scheme differs substantially from other multiplexing schemes known in the art as noted below.

In accordance with embodiments of the present disclosure, each detector is coupled to a linear array of capacitors each transferring charge to the next capacitor in the series. The output is coupled to the last capacitor. Thus for a system in accordance with embodiments of the present disclosure with 10 detectors and 1000 time stamps, there are only 10 outputs that must be sampled and digitized, reducing power and simplifying the output circuitry. Scalability is also enhanced.

Additional features and advantages of embodiments of the present disclosure will become more readily apparent from the following detailed description, particularly when taken together with the accompanying drawings.

DETAILED DESCRIPTION

Figure 1:
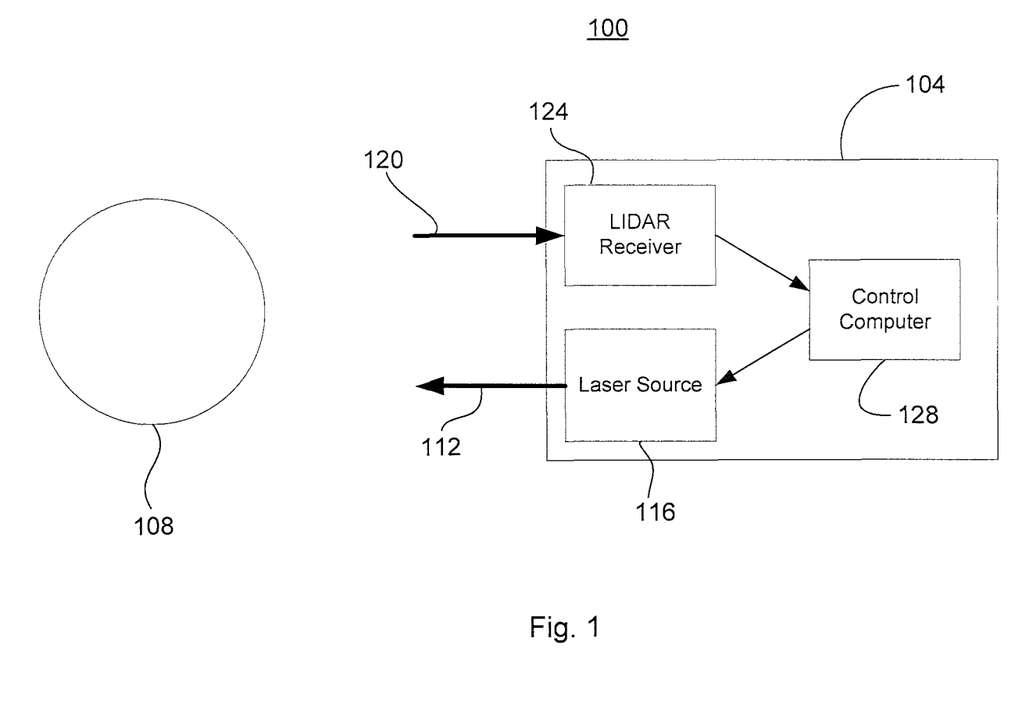
FIG. 1 is a diagram depicting a LIDAR system in accordance with embodiments of the present invention in an exemplary operating environment.

FIG. 1 depicts a light detection and ranging (LIDAR) system 100 in an exemplary operating environment. The LIDAR system 100 may be carried by or connected to a platform 104 such that a target 108 is within the line of sight of the LIDAR system 100. As an example but without limitation, a platform 104 can include a satellite, an aircraft, a ship, a wheeled vehicle, etc. The LIDAR system operates by sending transmitted light 112 from a light source or laser system 116 towards the target object 108, such as a forest on the surface of the Earth, a kelp bed in an ocean, the atmosphere, etc. A received signal 120, in the form of photons included in the transmitted light 112 that have been reflected from the target 108, is received at a three-dimensional detector or LIDAR receiver 124. As can be appreciated by one of skill in the art, the LIDAR receiver 124 can determine range information with respect to the target 108, based on the time of flight of the transmitted 112 and returned 120 light. The light source 116 and LIDAR receiver 124 can be operated in connection with a control computer 128.

Figure 2:
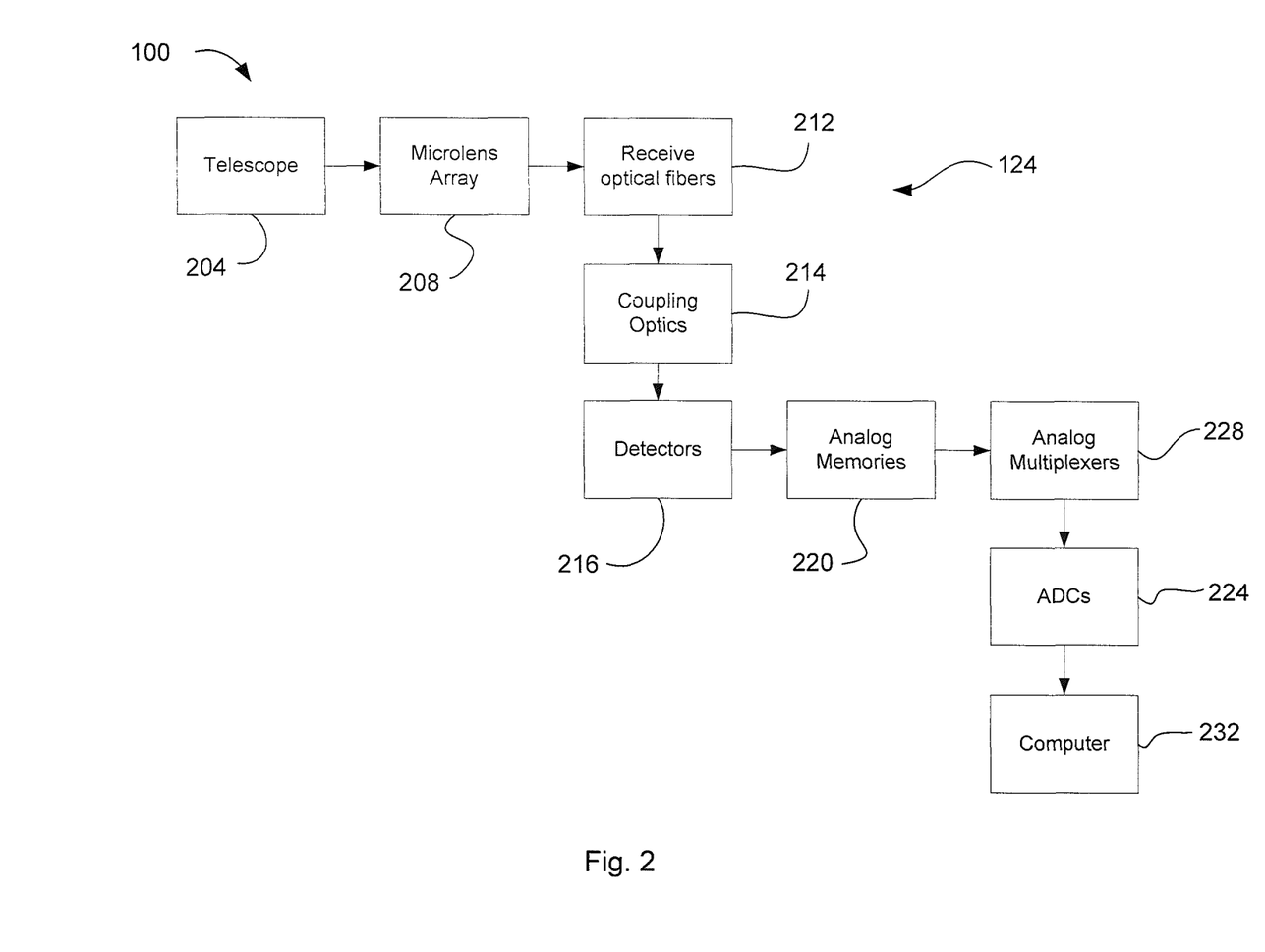
FIG. 2 is a block diagram depicting components of a LIDAR system in accordance with embodiments of the present invention.

FIG. 2 illustrates components of a LIDAR system 100 in accordance with at least some embodiments of the disclosed invention. More particularly, FIG. 2 illustrates components of the 3D detector or LIDAR receiver 124. These components include a telescope 204, which gathers light from within the field of view of the LIDAR receiver 124, including received light 120 that has been reflected from a target 108 (see FIG. 1). Light gathered by the telescope 204 is provided to a microlens array 208. The microlens array 208 couples light gathered by the telescope 204 with the receive ends of receive optical fibers 212. More particularly, each microlens in the microlens array 208 focuses received light onto the end of an optical fiber included in the receive fibers 212. Accordingly, each microlens within the microlens array 208 can be paired with an end of an optical fiber included in the receive fibers 212 to define the optical input of a pixel. Moreover, the microlens array 208, in combination with the receive fibers 212, defines or forms the receive plane of the LIDAR receiver 124.

The receive fibers 212 directly pass received photons to detectors 216 or pass received photons to detectors 216 via coupling optics 214. The detectors 216 can comprise photon detectors that generate an electrical signal in response to the receipt of one or more photons. In addition, at least one detector is associated with each receive fiber 212. As can be appreciated by one of skill in the art after consideration of the present disclosure, the detectors 216 can be located remotely with respect to the microlens array 208 and the receive ends of the receive fibers 212. For example, the microlens array 208 and the receive ends of the receive fibers 212 can be associated with one or more substrates that are separate from the one or more substrates to which the detectors 216 are interconnected or formed on. Accordingly, the geometry of the detectors 216, and in particular the space occupied by the detectors 216, is not constrained by the area of the receive fibers 212 at their receive end and/or the microlens array 208.

Each detector included in the detectors 216 is associated with an analog memory included in a set of analog memories 220. In accordance with embodiments of the disclosed invention, the analog memories 220 can be contained on one or more chips or substrates that are separate from one or more chips or substrates on which the detectors 216 are formed or mounted. For example, the detectors 216 can be interconnected to the analog memories 220 by wire bonds or other electrical conductors and amplifier circuits may be placed between the detectors 216 and the analog memories 220. The analog memories 220 may each comprise a switched capacitor array. Together, the microlens array 208, receive fibers 212, detectors 216, and analog memories 220 comprise what is referred to herein as a distributed focal plane assembly (DFPA).

The analog memories 220 are interconnected to one or more analog to digital converters 224 by one or more analog multiplexers 228. For example, an analog multiplexer 228 comprising an analog switch can sequentially interconnect a set of analog memories 220 in sequence to an analog to digital converter 224. By utilizing a multiplexer 228 to interconnect a plurality of analog memories 220 in sequence to an analog to digital converter 224, the utilization rate of each analog to digital converter 224 is increased, increasing the power efficiency of the system 100. In addition, by using analog memories 220 to initially store signals produced by the detectors 216, relatively lower speed analog to digital converters 224 can be utilized. The digitized data can then be provided from the analog to digital converters 224 to a computer 232. The computer 232 can, as can be appreciated by one of skill in the art, perform further processing, store data in a digital format, and/or transmit collected data to other computers or devices. Moreover, the computer 232 can be provided as part of the LIDAR receiver 124, and/or as part of the control computer 128.

In still other embodiments, telescope 204 may directly or in combination with a microlens array 208 illuminate detectors 216 to form an alternate distributed focal plane assembly (DFPA). In such embodiments, the receive optical fibers 212 and coupling optics 214 can be omitted.

Figure 3:
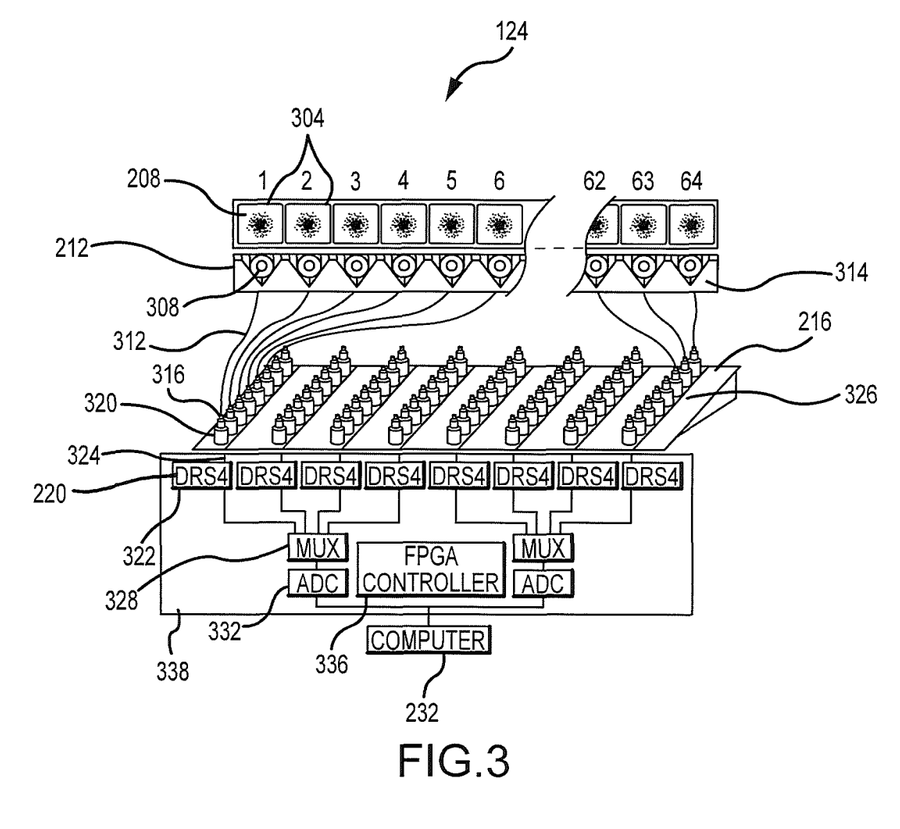
FIG. 3 depicts additional aspects of a LIDAR system in accordance with embodiments of the present invention.

FIG. 3 is another view of components of a LIDAR receiver 124 provided as part of a LIDAR system 100 featuring a distributed focal plane assembly in accordance with embodiments of the present invention. As shown, each microlens 304 within a microlens array 208 is associated with the receive or first end 308 of an optical fiber 312 included in the set of receive fibers 212. Although shown separate from one another in the figure for ease of illustration, each lens 304 is aligned so as to direct light received at the lens 304 to the receive end 308 of a corresponding optical fiber 312. The microlens array 208 and first ends 308 of the optical fiber 312 may be arranged to form a one-dimensional (as shown) or two-dimensional focal plane array. The receive optical fibers 312 each have a second end 316 that terminates at a detector 320 included in a set or array of detectors 216. In accordance with embodiments of the present invention, each of the detectors 320 can comprise an avalanche photodiode. As illustrated in the figure, the receive ends 308 of the set of receive fibers 212 can be located at a distance from the detectors 320 included in the set of detectors 216. Moreover, the receive ends 308 of the optical fibers 312 need not be registered with the corresponding detector 320 in the set of detectors 216. For example, as illustrated in the figure, the receive ends 308 may be part of a one-dimensional array (a 1×64 array in the figure), formed on or interconnected to a receive end substrate 314 while the detectors 320 can be included in a set of detectors 216 arranged in a two-dimensional array formed on or interconnected to a detector substrate 326.

The analog memories 220 can be interconnected to the set of detectors 216 by corresponding signal lines 324. The signal lines 324 may, for example, comprise wire bonds. Circuitry may also be used to amplify the signal between the detector outputs and the analog memory inputs. Accordingly, the analog memories 220 can be formed on a read out circuitry or analog memory substrate 338, and need not be registered with or formed on a substrate on which the individual detectors 320 are formed. As also shown, a number of analog memory units 322 comprising the analog memory 220 can be interconnected to a shared analog multiplexer 328 included in the analog multiplexers 228. An analog to digital converter (ADC) 332 included in the set of analog to digital converters 224 can be provided for each analog multiplexer 328. In addition to a computer 232, a controller 336, for example a field programmable gate array (FPGA) controller, can be provided to control the collection of data from the analog memories 220 in sequence by the multiplexers 328, for delivery to an ADC 332, and to control the operation of the ADC 332.

More specifically, the data from substantially all or at least many of the detectors 320 in a LIDAR system is stored in analog memory 220. The data is then fed sequentially into a single or into just a few (relatively slow) ADCs 332 for digitization. This system has a very low power dissipation relative to systems utilizing large numbers of fast ADCs. As an example, one channel of a data storage circuit in accordance with the present invention may dissipate about 17 mW while a high speed ADC may dissipate over a Watt. Thus a power reduction on the order of 1 W/17~mW 50 may be possible. More specifically, the data storage circuit may include an analog memory 220. Even more specifically the analog memory 220 may be a plurality of switched capacitor arrays. A particular analog memory may be for example a DRS4, 9 Channel, 5 GSPS Switched Capacitor Array, manufactured by the Paul Scherrer Institute in Switzerland http://drs.web.psi.ch/docs/DRS4_rev09.pdf. The LIDAR data from for example 1000 detectors (channels) can be fed—8 channels each on 1000/8=125 DRS4 chips. The data can be subsequently read out in series one channel at a time one DRS4 at a time into for example 30 medium speed ADCs 332. The duty cycle would be 0.02 or 2%, much better than utilizing one ADC for each channel. For the DRS4 chip, the readout rate would be 33 MHz, where the DRS4 is optimized. As the DRS4 can hold data for ~1 ms, 30 medium speed ADCs are required for a 1000 channel system with 1000 time slices per channel. Additionally, it may be easier to procure high accuracy radiation hard ADCs if the operating speed requirements can be relaxed. Note that this technology is applicable to both 1-D linear arrays of detectors and to 2-D arrays of detectors.

Figure 4A:
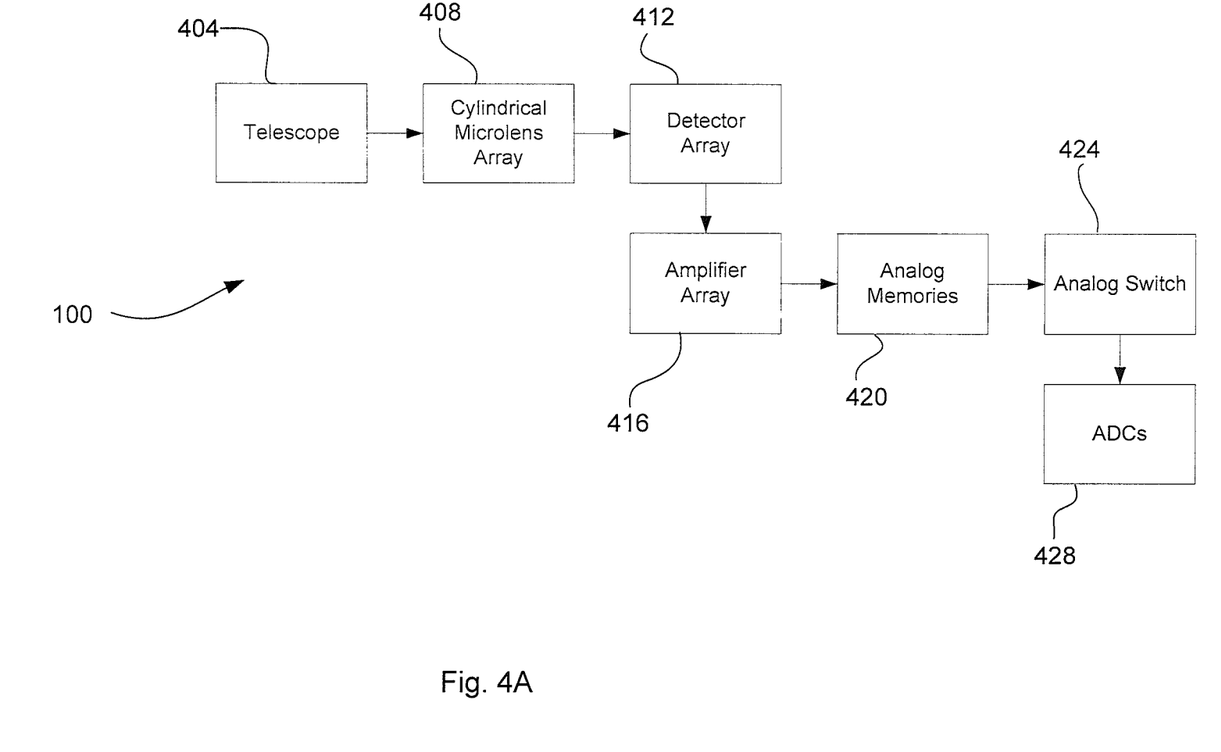
FIGS. 4A and 4B are block diagrams depicting components of LIDAR systems in accordance with other embodiments of the present invention.

FIG. 4A is a block diagram depicting components of a LIDAR receiver 124 included in a LIDAR system 100 in accordance with other embodiments of the present invention. More particularly, FIG. 4A illustrates components of a LIDAR receiver 124 that features Geiger mode avalanche photodiodes (GM-APDs). The LIDAR receiver 124 includes a telescope 404 that collects light, including received light 120 that has been reflected from a target 108 (see FIG. 1). The light collected by the telescope 404 is provided to a cylindrical microlens array 408. The cylindrical microlens array 408 operates to change the area over which received photons are distributed. For example, a cylindrical microlens array 408 may take light from within an area defining a pixel of the LIDAR receiver 124, and distribute that light over an area that is 100 μm wide (i.e., 100 μm in the cross-track direction) and 3 mm long (i.e., 3 mm in the along-track direction). As an alternative to a cylindrical microlens, this redistribution of received light can be performed by alternate components, such as an asymmetric diffuser.

The light from the cylindrical microlens array 408 is then provided to a detector array 412. In accordance with the embodiments of the LIDAR receiver 124, each detector in the detector array 412 can comprise an array of Geiger Mode Avalanche Photodiodes (GM-APDs). For example, each pixel of a LIDAR receiver 124 can be associated with a 10×300 array of GM-APDs wired in parallel. As can be appreciated by one of skill in the art, a Geiger mode avalanche photodiode can be extremely sensitive, and therefore is suitable for use in photon counting applications. However, individual Geiger mode avalanche photodiode detectors require significant recharge times between detection events. Therefore, systems using a single Geiger mode avalanche photodiode are not suitable for use in a LIDAR system that seeks to provide high vertical resolution. However, by providing a cylindrical microlens, an asymmetric diffuser, or other optical structure or element, light received within an area comprising a pixel can be smeared across an area having different dimensions than the receive area of the pixel in which a number of Geiger mode APDs are distributed. For example, a photon received within an area of a pixel may be passed by the cylindrical microlens to an area (e.g., an area that is 100 μm wide by 3 mm long) containing 3000 GM-APDs in a 10×300 array. In particular, the received photon will be passed to one of the GM-APDs. In response, the receiving GM-APD will generate an electrical signal. If a second photon is received at the same pixel, probabilistically that second photon will be received at a different GM-APD. Therefore, even if the second photon is received while the GM-APD that received the first photon is still re-charging, the pixel will be capable of producing an electrical signal in response to the receipt of the second photon. In addition, each pixel is capable of providing intensity information. In particular, where a relatively large number of photons are received at a pixel, probabilistically those photons will be distributed by the microlens such that different photons are received at different GM-APDs within the pixel. Therefore, even though a single GM-APD may produce a signal in response to the receipt of a single photon, by providing additional GM-APDs within the pixel, and by distributing the received photons using the cylindrical microlens or other optical element, a signal indicative of the intensity and arrival time of the received light can be provided.

Signals from the detector array 412 are provided to an amplifier array 416. In particular, the output from each detector within the detector array 412 is provided to an associated amplifier in the amplifier array 416, to generate an amplified signal. That amplified signal is then provided to analog memory 420. Accordingly, an analog memory cell can be provided for each pixel of the LIDAR receiver 124. Similar to other embodiments, one or more analog switches or multiplexers 424 can be used to sequentially read out data stored in the analog memories 420 to one or more analog to digital converters 428.

Figure 4B:
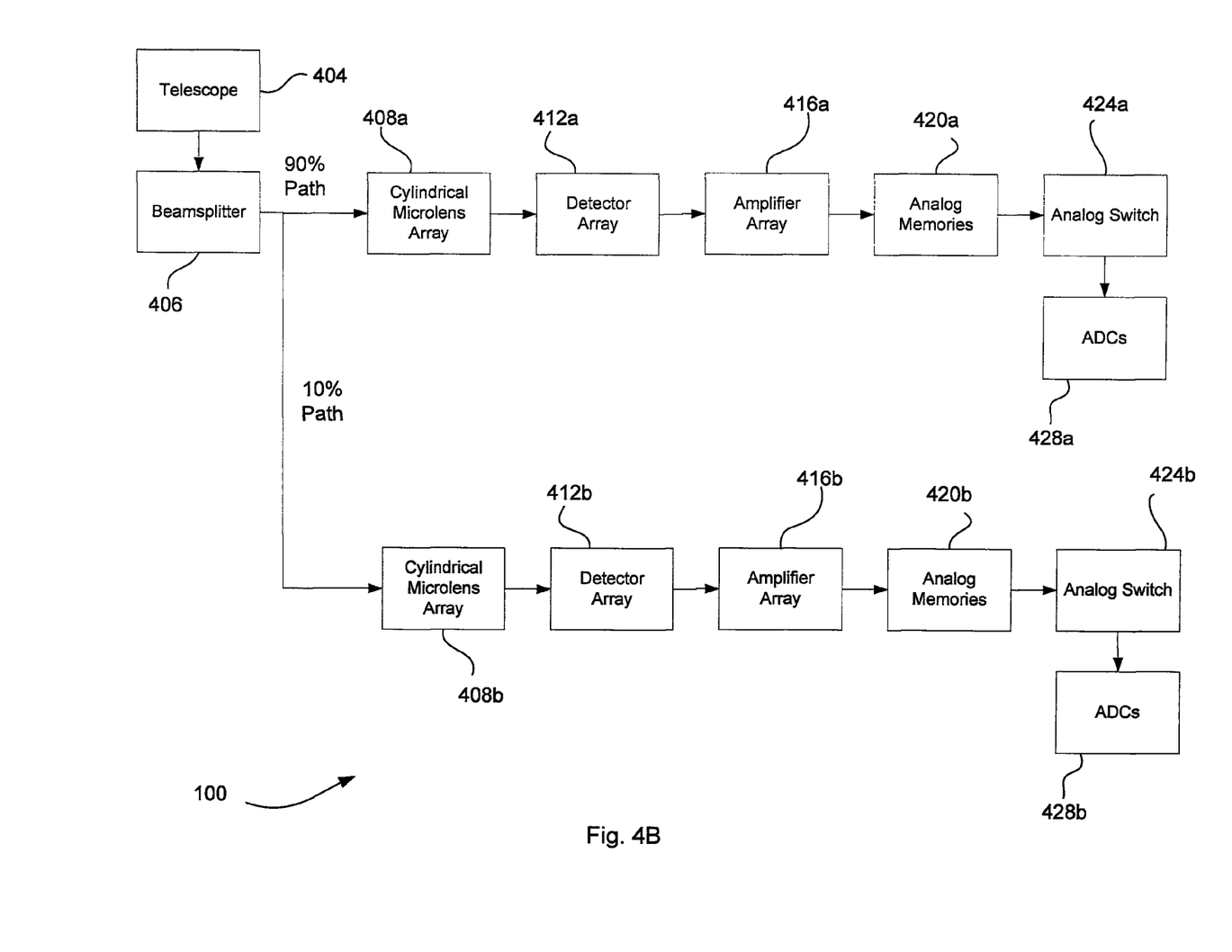

In accordance with at least some embodiments, as illustrated in FIG. 4B, the light received by a telescope 404 of a LIDAR receiver 124 can be passed to a beam splitter assembly 406. The beam splitter assembly may provide a first proportion of the received light to a first cylindrical microlens array, and may provide a second proportion of the received light to a second cylindrical microlens array. For example, the first proportion may comprise about ninety percent of the received light, and the second proportion may comprise about ten percent of the received light, where the proportion is "about" the stated amount if it is within plus or minus one percent of that amount. The first cylindrical microlens array 408a in such a system then passes light to a first detector array 412a, which is interconnected to an associated first amplifier array 416a, first analog memories 420a, a first analog switch 424a, and a first analog to digital converter 428a. The second cylindrical microlens array 408b is associated with a second detector array 412b, which is interconnected to a second amplifier array 416b, second memories 420b, a second analog switch 424b and to a second analog to digital converter 428b. Accordingly, first and second parallel detector paths are included in such embodiments. These parallel paths can be associated with dedicated analog to digital converters 428a and 428b as shown, or the paths can share one or more analog to digital converters 428. As can be appreciated by one of skill in the art after consideration of the present disclosure, the provision of different proportions of received light to different detector channels can provide a LIDAR receiver 124 with enhanced dynamic range as compared to systems with a single optical channel. In particular, the channel receiving ninety percent of the received light can provide high sensitivity while the channel receiving ten percent of the received light can provide increased resistance to saturation but lower sensitivity as compared to the first channel.

Figure 5:
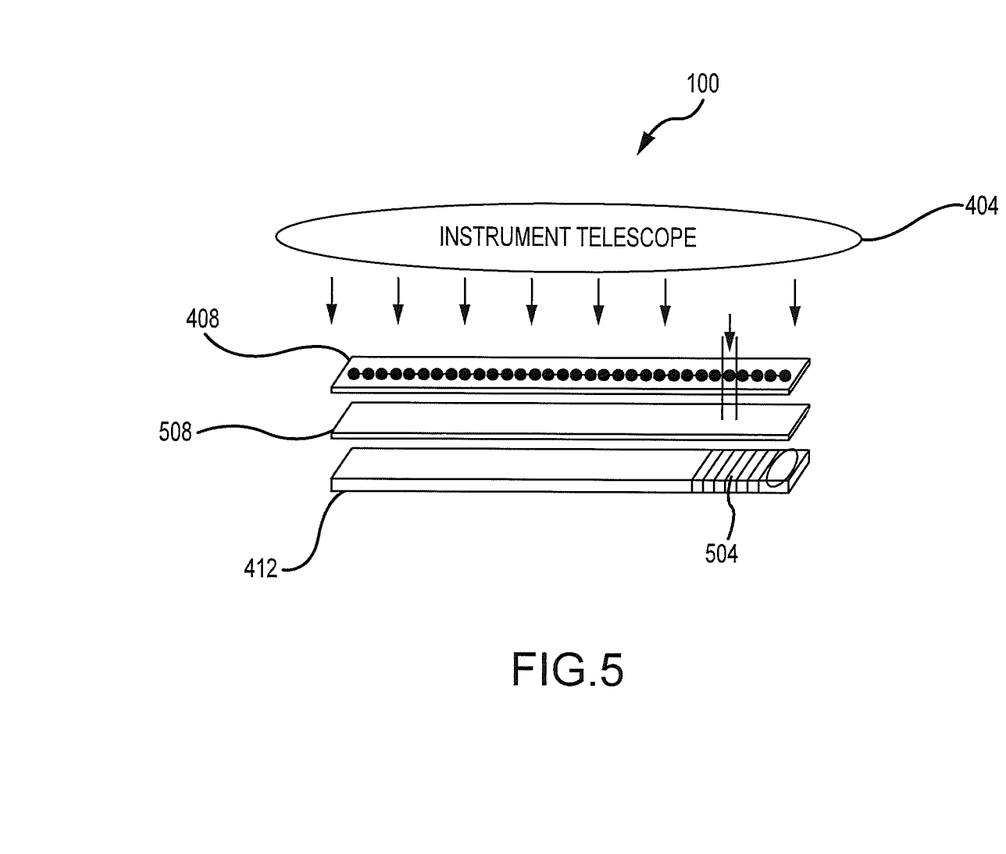
FIG. 5 depicts additional aspects of a LIDAR system in accordance with other embodiments of the present invention.

FIG. 5 depicts additional aspects of a LIDAR receiver 124 utilizing detectors comprising arrays 412 of GM-APDs in accordance with embodiments of the present invention. More particularly, a detector array 412 may comprise a linear array of pixels 504. Each pixel 504 may include an array of GM-APDs. For example, each pixel 504 may comprise an 8×20 array of GM-APDs. In accordance with still other embodiments, each pixel 504 may comprise any number of GM-APDs. In this embodiment, in addition to a microlens array 408, a holographic diffuser or elliptical lenslet array 508 is included.

Figure 6:
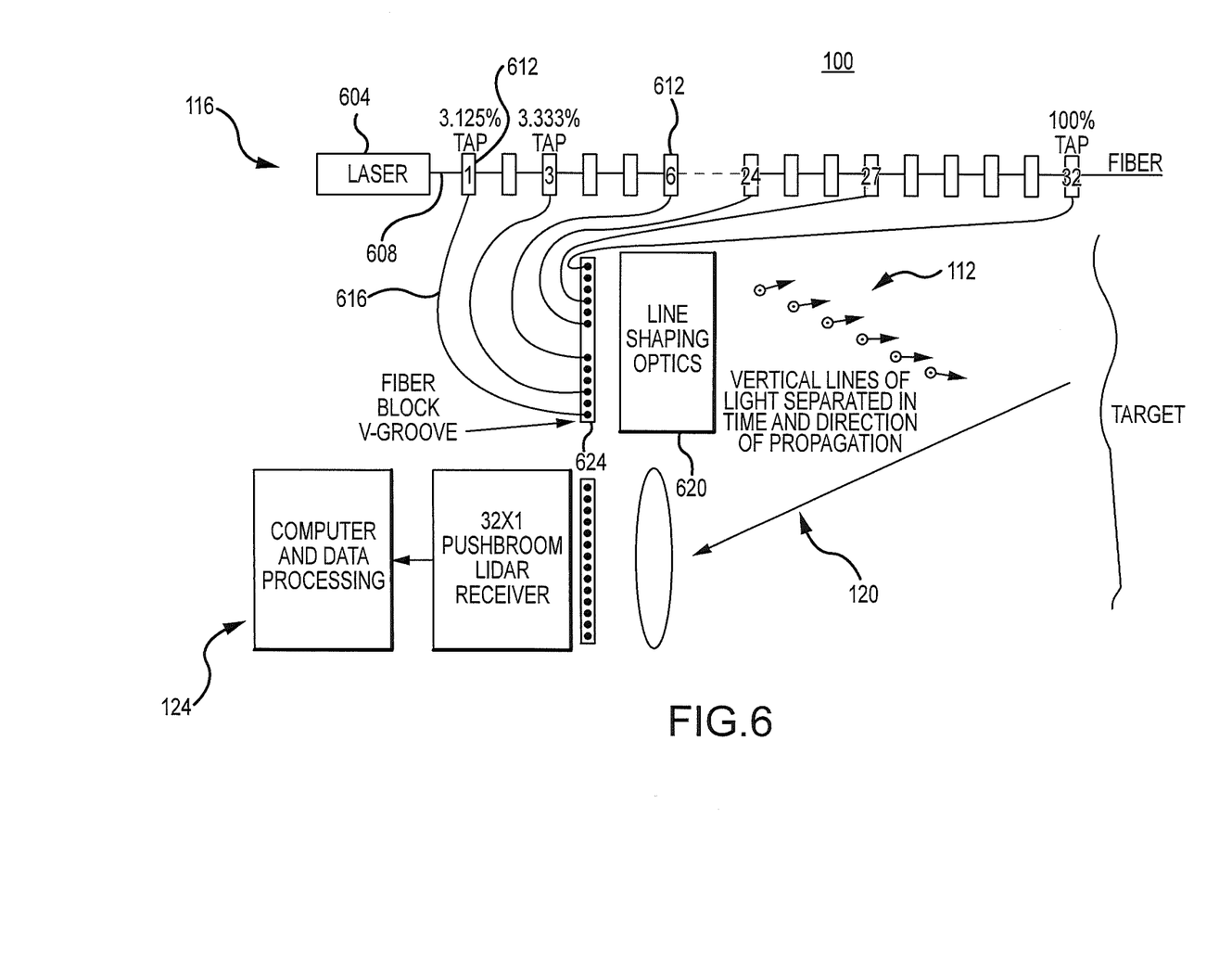
FIG. 6 depicts an angle-time-space LIDAR multiplexer in accordance with other embodiments of the present invention.

FIG. 6 depicts components of a LIDAR system 100 in accordance with embodiments of the present disclosure in which the output of the laser source 116 is multiplexed. The multiplexed laser source 116 generally includes a laser or light source 604. The output of the laser 604 is coupled to a primary optical fiber 608. The primary optical fiber 608 is associated with a plurality of taps 612. The taps 612 are located at intervals along the length of the primary optical fiber 608. Each tap 612 is connected to a first end of an output optical fiber 616. The second end of each output optical fiber 616 is positioned by an alignment member 624, for example in the form of a block with V-shaped grooves to hold the second ends of the output optical fibers 616, to deliver a beam of light to a beam shaping element 620 at a selected angle with respect to a reference or output plane. Moreover, the second end of each output optical fiber 616 may be aligned to deliver a beam of light at a different angle with respect to the output plane.

The length of primary optical fiber 608 by which each pair of taps 612 are separated is selected to create a selected spacing in time between pulses of light 112 output by the taps 612. More particularly, the spacing is selected so that light output from the LIDAR system 100 as part of a first output pulse and that is reflected from a target can be distinguished from light output from the LIDAR system 100 as part of a second, subsequent output pulse. As an example, in a multiplexed laser source 116 with a 32 by 1 1-D LIDAR system the outgoing laser pulse can be split into 32 pulses, each of which are offset in time by an amount that is dependent on the length of primary optical fiber 608 between each tap 612. The temporal offset between the output optical fibers 616 associated with adjacent taps is a function of the speed of light in the fiber and the difference in path length between the adjacent output optical fibers 616. More particularly, the separation in time between output pulses from adjacent output optical fibers 616 is approximated by the function: $t=nL/c$, where t is time in seconds, n is the index of refraction of the primary optical fiber 608, L is the difference in path length in meters of light travelling through adjacent output optical fibers 616, and c is the speed of light in a vacuum in meters/second.

The beams output by the different output optical fibers 616 are also spatially offset. More particularly, the second end of each output optical fiber 616 may be held by an alignment member 624, such as a v-groove fiber block. The beam shaping element 620 receives beams of light from the output optical fibers 616, and disperses the light into a series of lines, one line per optical fiber output. The centers of each line of light generally fall onto a line themselves which we'll call the "scan line". The "scan line" is a line that is generally perpendicular to the direction of propagation of the lines of light from the LIDAR. The "scan line" may also be substantially parallel to the fields of view of the individual detectors that comprise detector array 412 in a LIDAR receiver 124 having a one-dimensional (linear) detector array 412. Each line of light that is output is generally perpendicular to the fields of view of the individual detectors that comprise linear detector array 412. As an example, the beam shaping element 620 may comprise a cylindrical lens that converts the light from each output optical fiber 616 into a line. The alignment member 624 holds the second ends of the output optical fibers 616 such that they each output light at a slightly different angle to the line shaping optics 620. As a result, each line of light is output from the beam shaper 620 at a slightly different angle, and the center of each line of light falls onto a different location along the scan line. The angle of the line of light with respect to a reference plane can increase with each subsequent output optical fiber 616.

In operation, the multiplexed laser source 116 produces a series of line pulses, separated in space and time. The effect of this is to illuminate a target with a series of lines that are parallel to a first axis, and that scan across the target in a direction that is substantially perpendicular to the first axis. The received signals can then be spatially and temporally de-convolved from the digitized receive data.

In accordance with still other embodiments, the delay between the output or second ends of different pairs of output optical fibers 616 can be different. A multiplexed laser source 116 can also use means other than different lengths of optical fiber to form a series of output pulses separated in time. For example, different materials with different indices of refraction can be used to transmit the different pulses of light. As another example, a series of lasers each emitting their light with a time offset relative to the other lasers may be used to generate the temporally separated pulses of light. A beam shaping element can propagate these different beams in different directions to illuminate a target with a series of lines. In yet another example, a high repetition rate laser may be combined with a high speed beam steering device. Alternatively or in addition, the delay imposed with respect to adjacent output beams can be variable. Embodiments of the present disclosure can also incorporate a mechanical, acousto-optical, or electro-optical scanning mechanism. For example, a scanning mechanism can change the direction of light output from the beam shaper 620 by a selected amount. By combining a scanning mechanism with a series of optical output fibers 616 having different output angles, a larger area can be scanned and/or the resolution of the scan can be increased as compared to embodiments without a scanning mechanism.

As can be appreciated by one of skill in the art after consideration of the present disclosure, by outputting a series of lines at slightly different angles with respect to the LIDAR system 100, data with respect to an imaged area can be obtained using a LIDAR receiver 124 having a one-dimensional detector array. Accordingly, a LIDAR system 100 in accordance with embodiments of the present disclosure is not required to utilize a two-dimensional detector array in order to obtain range data over a two-dimensional area. As can also be appreciated by one of skill in the art after consideration of the present disclosure, the light reflected from a target illuminated using a multiplexed laser source 116 as described herein will generally be in the form of a sequence of return signals. Accordingly, a LIDAR system 100 can incorporate a multiplexed laser source 116 in combination with a LIDAR receiver 124 that utilizes a one-dimensional detector array 412. That detector array can comprise a plurality of pixels 504 disposed in a linear array, in which each pixel includes an array of individual detector elements that are provided with light from a diffuser 508, for example as described in connection with FIG. 5. In addition, a LIDAR system 100 can incorporate a dispersed focal plane assembly, and can include analog memory, as also described herein. Moreover, such features can be included in any combination.

While FIG. 6 has described the use of a one-dimensional line array of detectors to effectively function as a two-dimensional detector array, a similar line of thought allows a single detector to effectively function as a one-dimensional detector array. In this case, the scanned output beam would be a spot rather than a line.

Figure 7:
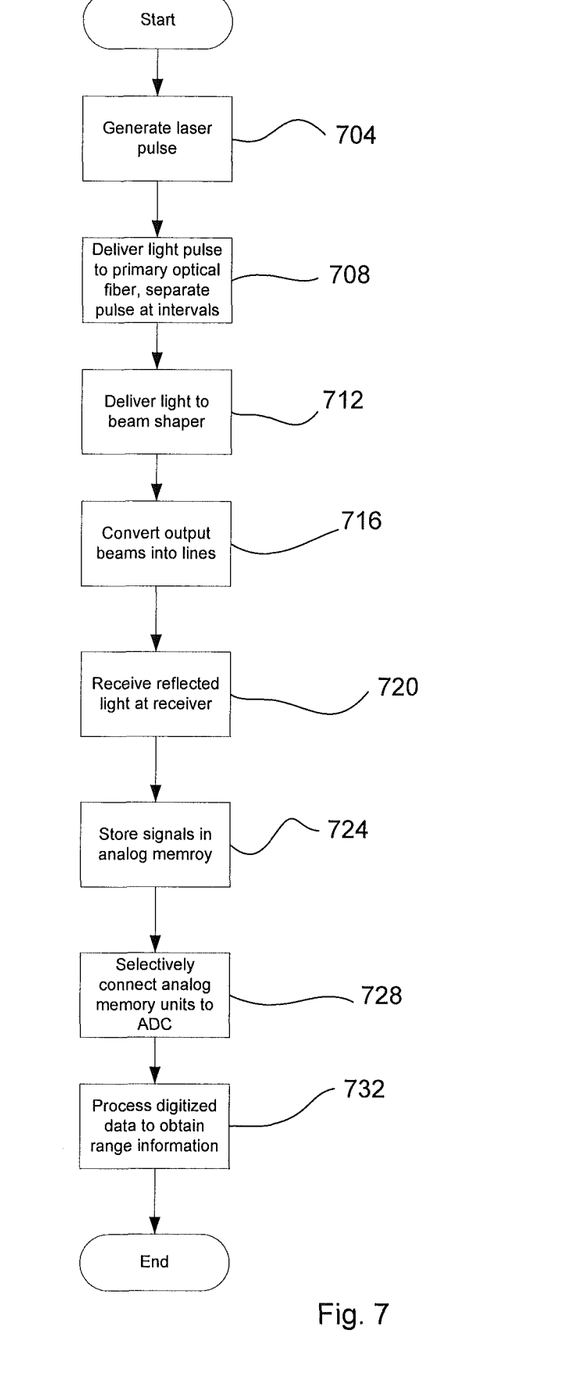
FIG. 7 depicts aspects of a method for acquiring three-dimensional data in accordance with embodiments of the present invention.

With reference now to FIG. 7, aspects of the operation of a LIDAR system 100 in accordance with embodiments of the present invention are illustrated. In particular, at step 704, a laser pulse is generated by a laser 604 of a laser source 116. The laser pulse may comprise a waveform having a particular shape. The laser pulse is then delivered to a primary optical fiber 608, and is separated in time by using taps 612 at intervals along the length of the primary optical fiber (step 708). The taps 612 each deliver light removed from the primary optical fiber 608 to a beam shaper 620 using associated output optical fibers 616 (step 712). More particularly, the output or second end of each output optical fiber 616 may be aligned to provide an output beam at a slightly different angle than any of the other output optical fibers 616. The output beams from the output optical fibers 616 are turned into lines by the beam shaper 620 (step 716). A series of lines are then output by the laser source 116.

The light that is output as a series of lines is directed towards an area or volume of interest. If the light is reflected from the area of interest back to the LIDAR system 100, it is received by the LIDAR receiver 124 (step 720). For example, the reflected light can be collected by the instrument telescope 404, and passed to a detector array 412. The signals produced by the pixels of the detector array can then be held in analog memory 220 (step 724). The individual units of analog memory 322 are then selectively connected to an analog to digital converter 332 by a switch or multiplexer 228 (step 728). In particular, a set of analog memory 322 can be connected to a shared ADC 332. Accordingly, the duty cycle or usage rate of the ADCs 332 can be increased as compared to a system in which there is only one ADC per memory unit. The digitized data can then be processed by the control computer 128 to obtain range information for the returned line of light (step 732).

If operation of the LIDAR system 100 is continued, additional light, for example from a second line output from the laser source 116 can be received at the LIDAR receiver 124. The processing of the returned light can include determining the angle at which the line of light was output by the LIDAR system 100, and the data thus obtained can be accumulated to build a set of three-dimensional data about the target. The process can then end.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:
1. A LIDAR system, comprising:
a plurality of detectors;
a plurality of optical inputs, wherein each detector in the plurality of detectors is associated with an optical input, and wherein the optical inputs are arranged to form a focal plane array;
a plurality of analog memory units, wherein each analog memory unit is electrically interconnected to a detector, wherein each analog memory unit occupies an area that is larger than an area occupied by each detector, wherein an area of at least some of the analog memory units is not registered with an area of an electrically interconnected detector, wherein each analog memory has one analog input and one analog output, and wherein the detectors and the analog memory units are on separate substrates.
2. The system of claim 1, comprising:
a plurality of optical fibers interconnected to a first substrate, wherein each optical fiber in the plurality of optical fibers has a first end and a second end, wherein the first ends of the optical fibers are arranged to form the focal plane array, wherein the plurality of detectors are interconnected to a second substrate, wherein the second end of each of the optical fibers included in the plurality of optical fibers of the focal plane array is associated with a detector, and wherein each optical fiber included in the plurality of optical fibers is operative to carry photons collected at a first end of the optical fiber to the detector associated with the second end of the optical fiber.

3. The system of claim 1, wherein each analog memory unit is electrically interconnected to a detector by a wire bond.

4. The system of claim 1, wherein each analog memory unit is electrically interconnected to a detector through an amplifier.

5. The system of claim 1, wherein the analog memory units are disposed on a plurality of substrates.

6. The system of claim 1, wherein the analog memory units are composed of switched capacitor arrays.

7. The system of claim 1, wherein the detectors include a plurality of photon sensitive pixels arranged to form a one-dimensional focal plane array, wherein each photon sensitive pixel includes a plurality of Geiger mode photo-detectors electrically connected in parallel, wherein the photon sensitive pixels are substantially rectangular with the shorter side of the photon sensitive pixels parallel to a line along which the one-dimensional focal plane array extends.

8. A LIDAR system, comprising:
a plurality of photon sensitive pixels, wherein the photon sensitive pixels are arranged to form a one-dimensional focal plane array, wherein the photon sensitive pixels are substantially rectangular, and wherein a shorter side of each of the photon sensitive pixels is parallel to a line along which the one-dimensional focal plane array extends;
a plurality of Geiger mode photo-detectors, wherein each photon sensitive pixel includes a plurality of Geiger mode photo-detectors that are electrically connected in parallel.

9. The system of claim 8, wherein the Geiger mode photo-detectors are substantially uniformly distributed within the photon sensitive pixels.

10. The system of claim 8, wherein the Geiger mode photo-detectors include Geiger mode avalanche photodiodes.

11. The system of claim 8, further comprising:
a beam splitter, wherein the beam splitter passes a first proportion of received light to the photon sensitive pixels in the one-dimensional focal plane array, wherein the beam splitter passes a second proportion of received light to a second plurality of photon sensitive pixels in a second one-dimensional focal plane array, and wherein the first and second proportions are different from one another.

12. The system of claim 8, further comprising:
a plurality of analog memory units, wherein each analog memory unit is electrically interconnected to the output of a photon sensitive pixel, wherein each analog memory unit occupies an area that is larger than an area of a photon sensitive pixel, wherein each analog memory unit is not registered with an area of a photon sensitive pixel, and wherein each analog memory has one analog input and one analog output.

13. The system of claim 12, wherein the photon sensitive pixels and analog storage elements are on separate substrates.

14. A LIDAR system, comprising:
an outgoing optical pulse generation system, wherein the outgoing optical pulse generation system generates sets of optical pulses, wherein there is a precise timing for each of the optical pulses within a set, wherein each of the optical pulses in the set is propagated at a different predetermined angle and at a different time, wherein a time delay between each of the optical pulses within the set is arranged to be larger than the time for light to travel roundtrip across a largest feature of a target in a direction normal to the LIDAR system; and
a LIDAR receiver, comprising a plurality of analog memory units, wherein each analog memory unit is electrically interconnected to a detector, wherein each analog memory unit occupies an area that is larger than an area of a detector, wherein an area of at least some of the analog memory units is not registered with an area of an electrically interconnected detector, wherein each analog memory unit has one analog input and one analog output, and wherein the detectors and analog memory units are on separate substrates.

15. The system of claim 14, wherein the outgoing pulse generation system includes:
a light source;
a primary optical fiber;
a plurality of taps or intervals along the primary optical fiber;
a plurality of output optical fibers, wherein each tap is interconnected to a first end of an output fiber; and
a beam shaping element.

16. The system of claim 14, wherein a plurality of lasers are used to generate the optical pulses within a set.

17. The system of claim 14, further comprising:
a plurality of optical fibers interconnected to a first substrate, wherein each optical fiber in the plurality of optical fibers has a first end and a second end, wherein the first ends of the optical fibers are arranged to form a focal plane array;
a plurality of detectors interconnected to a second substrate, wherein each of the second ends of the optical fibers included in the plurality of optical fibers of the focal plane array is associated with a detector included in the plurality detectors, wherein each optical fiber included in the plurality of optical fibers is operative to carry photons collected at a first end of the optical fiber to the detector associated with the second end of the optical fiber;
a plurality of analog memory units, wherein each analog memory unit is electrically interconnected to a detector included in the plurality detectors.

18. The system of claim 14, wherein the detectors include a plurality of Geiger mode photo-detectors electrically connected in parallel, wherein the Geiger mode photo-detectors are arranged to form a photon sensitive pixel;
a plurality of photon sensitive pixels, wherein the pixel optical inputs are arranged to form a one-dimensional focal plane array, wherein the photon sensitive pixels are substantially rectangular with the shorter side of the photon sensitive pixels parallel to the one-dimensional focal plane array.

* * * * *